United States Patent
Suzuki

(10) Patent No.: US 12,491,753 B2
(45) Date of Patent: Dec. 9, 2025

(54) THERMAL MANAGEMENT SYSTEM

(71) Applicant: TOYOTA JIDOSHA KABUSHIKI KAISHA, Toyota (JP)

(72) Inventor: Tomoaki Suzuki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 131 days.

(21) Appl. No.: 18/530,821

(22) Filed: Dec. 6, 2023

(65) Prior Publication Data
US 2024/0300294 A1   Sep. 12, 2024

(30) Foreign Application Priority Data
Mar. 9, 2023   (JP) .................................. 2023-036625

(51) Int. Cl.
*B60H 1/00*   (2006.01)

(52) U.S. Cl.
CPC ..... *B60H 1/00885* (2013.01); *B60H 1/00278* (2013.01)

(58) Field of Classification Search
CPC ....................... B60H 1/00885; B60H 1/00278
See application file for complete search history.

(56) References Cited

U.S. PATENT DOCUMENTS

2021/0301691 A1   9/2021   Hasegawa et al.

FOREIGN PATENT DOCUMENTS

JP   2021-154767 A   10/2021

*Primary Examiner* — Jonathan Bradford
(74) *Attorney, Agent, or Firm* — SoraIP, Inc.

(57) ABSTRACT

The thermal management system includes a power storage device in a first flow path, a drive device in a second flow path, a radiator in a third flow path, a chiller device in a fourth flow path, a switching device, and a control device. In the thermal management system, the switching device is controlled so that the first connecting flow path to which the first flow path and the fourth flow path are connected, the drive device, and the radiator are separated from each other and become independent.

8 Claims, 7 Drawing Sheets

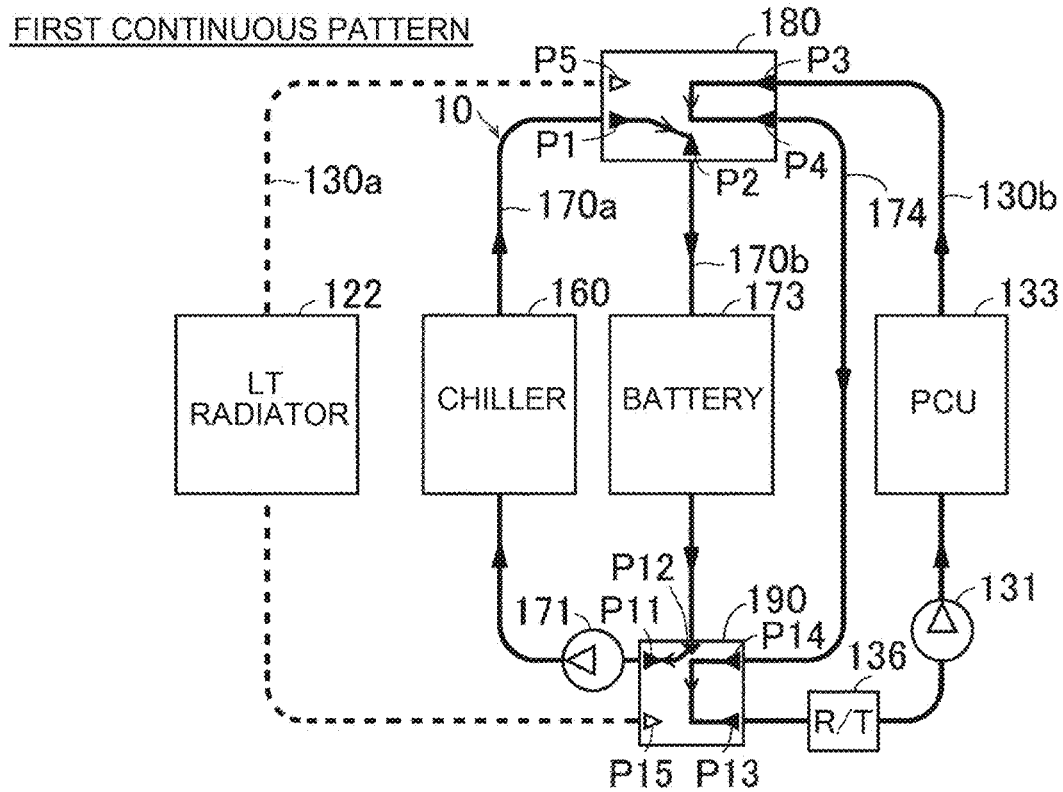
FIG. 2 FIRST CONTINUOUS PATTERN
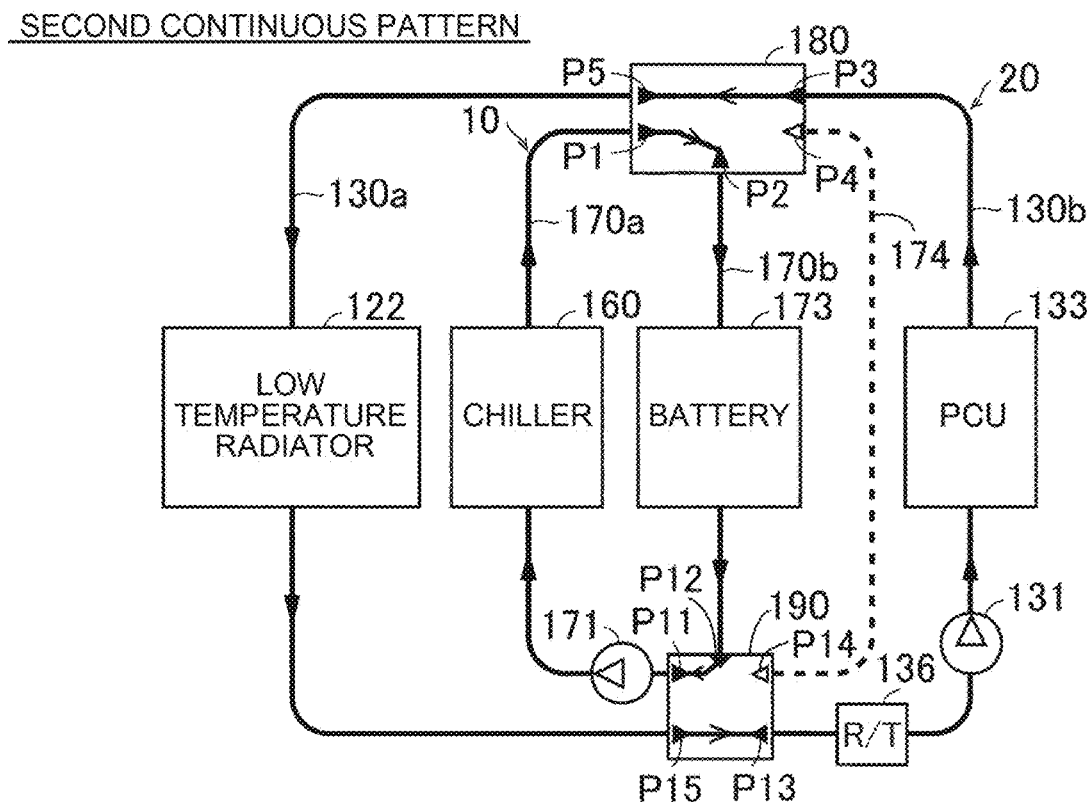
FIG. 3 SECOND CONTINUOUS PATTERN

FIRST CONTINUOUS PATTERN

SECOND CONTINUOUS PATTERN

THERMAL MANAGEMENT SYSTEM

CROSS-REFERENCE TO RELATED APPLICATION

This application claims priority to Japanese Patent Application No. 2023-036625 filed on Mar. 9, 2023, incorporated herein by reference in its entirety.

BACKGROUND

1. Technical Field

The present disclosure relates to a thermal management system.

2. Description of Related Art

Japanese Unexamined Patent Application Publication No. 2021-154767 (JP 2021-154767A) discloses an electrified vehicle. The electrified vehicle includes a battery, a drive device including a PCU, etc., a radiator (low temperature radiator), and a chiller. A heat medium flowing through the drive device is heated by heat generated when the drive device is driven. When the battery is driven by the drive device, the battery is also heated.

SUMMARY

In a system described in JP 2021-154767A, when the heat medium flowing through the drive device is heated, the heat medium does not flow through the battery. Therefore, the temperature of the battery may rise excessively due to self-heating. Therefore, a thermal management system is desired that can easily adjust the temperature of the battery (power storage device) while heating the heat medium flowing through the drive device (while storing heat in a second flow path).

The present disclosure has been made to solve the above issue, and an object of the present disclosure is to provide a thermal management system that can easily adjust a temperature of a power storage device while heating a heat medium flowing through a drive device.

A thermal management system according to one aspect of the present disclosure includes:
- a first flow path, a second flow path, a third flow path, and a fourth flow path through which a heat medium is able to flow;
- a power storage device that performs heat exchange with the heat medium in the first flow path;
- a drive device that performs heat exchange with the heat medium in the second flow path and that is able to generate driving force;
- a radiator provided in the third flow path;
- a chiller device provided in the fourth flow path; and
- a switching device that is able to switch a connection state between the first flow path, the second flow path, the third flow path, and the fourth flow path.

A flow path circuit in which a first connection flow path connecting the first flow path and the fourth flow path, the drive device, and the radiator are disconnected from and independent of each other, is defined as a heating circuit.

The switching device constitutes the heating circuit when heating is performed in which the heat medium in the second flow path is heated.

In the thermal management system according to the aspect of the present disclosure, as described above, the heating circuit in which the first connection flow path connecting the first flow path and the fourth flow path, the drive device, and the radiator are disconnected from and independent of each other, is constituted, when the heating is performed in which the heat medium in the second flow path is heated. Thus, since the second flow path is disconnected from other flow paths, it is possible to suppress heat from the drive device from being taken away by other flow paths (devices). As a result, the heat medium flowing through the drive device can be heated. Furthermore, since the first flow path and the fourth flow path are connected, the power storage device can be easily cooled using the chiller device. As a result, the temperature of the battery can be easily adjusted while heating the heat medium flowing through the drive device (while storing heat in the second flow path).

The thermal management system according to the aspect, desirably, further includes
- a medium temperature sensor that detects a temperature of the heat medium in the second flow path.

When a detected value of the medium temperature sensor is lower than a threshold value, the switching device constitutes the heating circuit. According to this configuration, the temperature of the medium temperature sensor can be easily made equal to or higher than the threshold value.

In this case, desirably, the switching device constitutes a second connection flow path connecting the second flow path and the third flow path while maintaining a state in which the first connection flow path is constituted, in a case in which the detected value of the medium temperature sensor is equal to or greater than the threshold value when the heating is performed in a state in which the heating circuit is constituted. According to this configuration, by connecting the second flow path and the third flow path, the heat of the heat medium in the second flow path can be released to the outside (for example, to the outside air) via the radiator. Further, by maintaining the state in which the first connection flow path is constituted, it is possible to suppress a sudden change in the temperature (state) of the power storage device due to switching of the flow path.

The thermal management system according to the aspect desirably includes a device temperature sensor that detects a temperature of the power storage device. When a detected value of the device temperature sensor is higher than a threshold value, the switching device constitutes the heating circuit. According to this configuration, the temperature of the power storage device can be easily lowered to the threshold value or less using the chiller device while the heat medium in the second flow path is heated by the heating circuit.

The thermal management system according to the aspect desirably includes:
- a medium temperature sensor that detects a temperature of the heat medium in the second flow path; and
- a device temperature sensor that detects a temperature of the power storage device.

When a detected value of the medium temperature sensor is lower than a first threshold value and a detected value of the device temperature sensor is higher than a second threshold value that is smaller than the first threshold value, the switching device constitutes the heating circuit. According to this configuration, the temperature of the heat medium in the second flow path can be easily raised to the first threshold value or more, and the temperature of the power storage device can be easily lowered to the second threshold value or less using the chiller device.

According to the present disclosure, the temperature of the power storage device can be easily adjusted while heating the heat medium flowing through the drive device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a diagram showing a first communication pattern of the thermal management circuit according to the first embodiment;

FIG. 3 is a diagram showing a second communication pattern of the thermal management circuit according to the first embodiment;

DETAILED DESCRIPTION OF EMBODIMENTS

Figure 1:
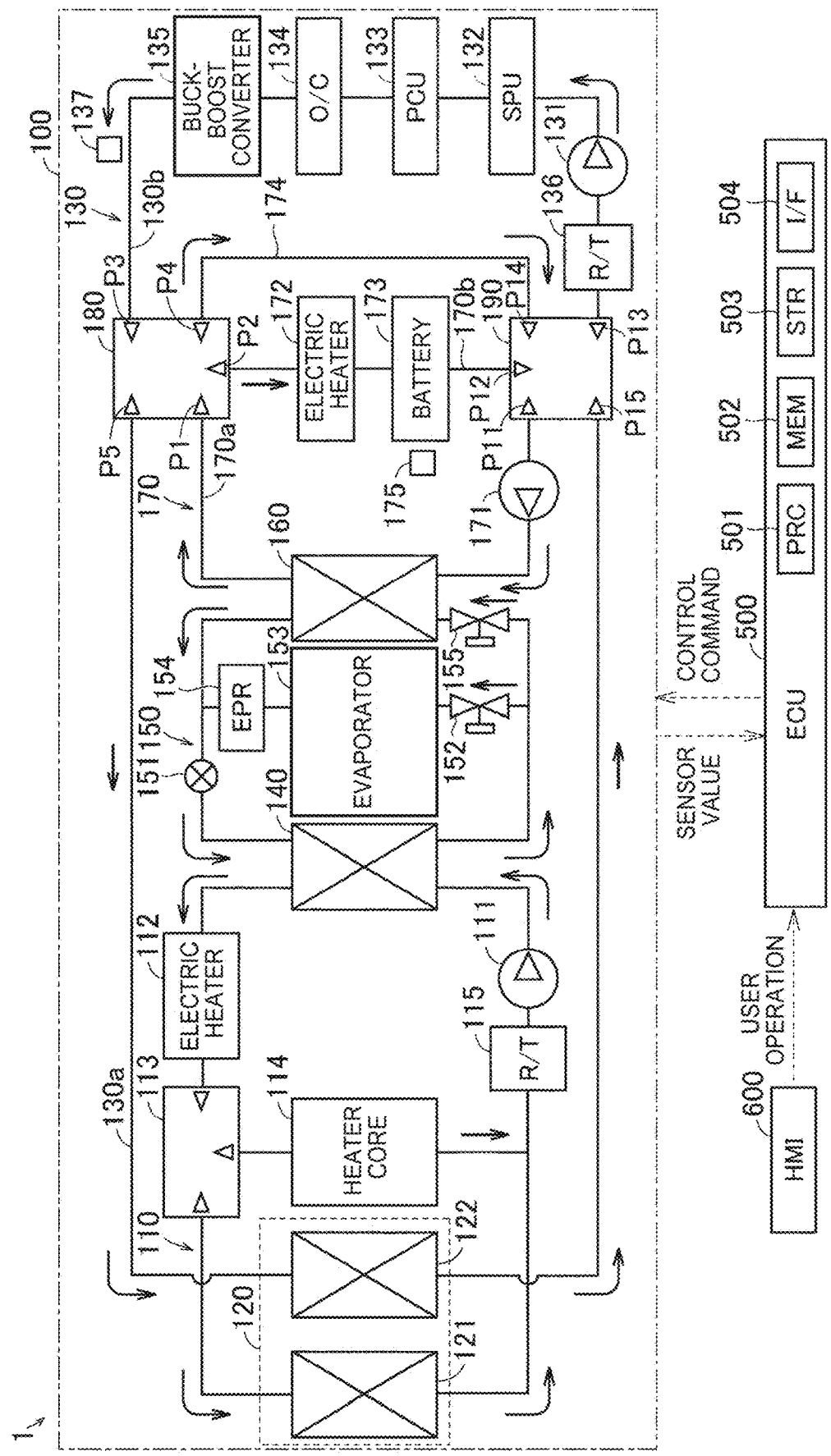
FIG. 1 is a diagram showing the configuration of a thermal management system according to a first embodiment.

Hereinafter, a first embodiment of the present disclosure will be described in detail with reference to the drawings. In the drawings, the same or corresponding parts are given the same reference numerals, and the description thereof will not be repeated.

In the following, the thermal management system according to the present disclosure is mounted on, for example, an electrified vehicle. However, the application of the thermal management system according to the present disclosure is not limited to vehicles.

First Embodiment

Overall Structure

As shown in FIG. 1, the thermal management system 1 includes a thermal management circuit 100, an electronic control unit (ECU) 500, and a human machine interface (HMI) 600.

The thermal management circuit 100 is configured so that a heat medium flows therethrough. The thermal management circuit 100 includes, for example, a high temperature circuit 110, a radiator 120, a low temperature circuit 130, a condenser 140, a refrigeration cycle 150, a chiller 160, a battery circuit 170, a five-way valve 180, and a five-way valve 190. Note that each of the five-way valve 180 and the five-way valve 190 is an example of a "switching device" of the present disclosure. Moreover, the chiller 160 is an example of a "chiller device" of the present disclosure.

High temperature circuit 110 includes, for example, a water pump (W/P) 111, an electric heater 112, a three-way valve 113, a heater core 114, and a reservoir tank (R/T) 115.

Radiator 120 is connected to (i.e., shared with) both high temperature circuit 110 and low temperature circuit 130. Radiator 120 includes a high temperature radiator 121 provided in high temperature circuit 110 and a low temperature radiator 122 provided in low temperature circuit 130. In the low temperature radiator 122, heat is exchanged between the heat medium flowing through the low temperature circuit 130 and the outside air. Note that the low temperature radiator 122 is an example of a "radiator" in the present disclosure.

The low temperature circuit 130 includes, for example, a water pump 131, a Smart Power Unit (SPU) 132, a Power Control Unit (PCU) 133, an oil cooler (O/C) 134, a buck-boost converter 135, and a reservoir tank 136, and a heat medium temperature sensor 137. Note that the PCU 133 and the oil cooler 134 are examples of a "drive device" in the present disclosure. Further, the heat medium temperature sensor 137 is an example of a "medium temperature sensor" of the present disclosure.

Condenser 140 is connected to both high temperature circuit 110 and refrigeration cycle 150. Refrigeration cycle 150 includes, for example, a compressor 151, an expansion valve 152, an evaporator 153, an Evaporative Pressure Regulator (EPR) 154, and an expansion valve 155.

Chiller 160 is connected to both refrigeration cycle 150 and battery circuit 170. In the chiller 160, the heat medium flowing through the battery circuit 170 and the medium circulating in the refrigeration cycle 150 exchange heat. Battery circuit 170 includes, for example, water pump 171, electric heater 172, battery 173, bypass path 174, and battery temperature sensor 175. Note that the battery 173 and the battery temperature sensor 175 are examples of a "power storage device" and a "device temperature sensor" of the present disclosure, respectively.

Each of five-way valve 180 and five-way valve 190 is connected to low temperature circuit 130 and battery circuit 170.

ECU 500 controls thermal management circuit 100. ECU 500 includes a processor 501, memory 502, storage 503, and interface 504.

The HMI 600 is a display with a touch panel, an operation panel, a console, etc. HMI 600 accepts user operations for controlling thermal management system 1. HMI 600 outputs a signal indicating a user operation to ECU 500.

The heat medium (usually hot water) circulating in the high-temperature circuit 110 is passed through a first path of water pump 111—condenser 140—electric heater 112—three-way valve 113—heater core 114—reservoir tank 115—water pump 111, and water pump 111—It flows through one or both of the following: condenser 140—electric heater 112—three-way valve 113—high temperature radiator 121—reservoir tank 115—second path of water pump 111.

The heat medium (cooling liquid) circulating in the low temperature circuit 130 includes: water pump 131—SPU 132—PCU 133—oil cooler 134—buck-boost converter 135—five-way valve 180—low temperature radiator 122—five-way valve 190—reservoir tank 136—Flows through the path of the water pump 131.

Water pump 131 circulates a heat medium within low temperature circuit 130 according to control instructions from ECU 500. SPU 132 controls charging and discharging of battery 173 according to control commands from ECU 500. PCU 133 converts DC power supplied from battery 173 into AC power according to control commands from ECU 500, and supplies the AC power to a motor (not shown) built into the transaxle.

Each of five-way valve 180 and five-way valve 190 switches the path of the heat medium in low temperature circuit 130 and battery circuit 170 in accordance with control commands from ECU 500. The low temperature radiator 122 is placed near the high temperature radiator 121 and exchanges heat with the high temperature radiator 121.

The heat medium temperature sensor 137 detects the temperature of the heat medium in a flow path (flow path 130b described later) in which the PCU 133 and the like are provided. For example, the heat medium temperature sensor 137 detects the temperature of the heat medium flowing between the buck-boost converter 135 and the five-way valve 180.

The heat medium (gas-phase refrigerant or liquid-phase refrigerant) circulating in the refrigeration cycle 150 is routed through a first path of compressor 151—condenser 140—expansion valve 152—evaporator 153—EPR 154—compressor 151, and compressor 151—condenser 140—expansion. It flows through one or both of the expansion valve 155, the chiller 160, and the second path of the compressor 151.

The heat medium (cooling liquid) of the battery circuit 170 is transmitted through a first path of water pump 171—chiller 160—five-way valve 180—electric heater 172—battery 173—five-way valve 190—water pump 171, and water pump 171—chiller. 160—five-way valve 180—bypass path 174—five-way valve 190—second path of water pump 171 or both.

Water pump 171 circulates a heat medium within battery circuit 170 according to control commands from ECU 500. Chiller 160 cools the heat medium circulating in battery circuit 170 by heat exchange between the heat medium circulating in refrigeration cycle 150 and the heat medium circulating in battery circuit 170. Electric heater 172 heats the heat medium according to control instructions from ECU 500. The battery 173 supplies power for running to a motor built into the transaxle. Battery 173 may be heated using electric heater 172 or cooled using chiller 160. Bypass path 174 is provided so that the heat medium bypasses electric heater 172 and battery 173. When the heat medium flows through the bypass path 174, a change in temperature of the heat medium due to at least one of heat absorption and heat radiation between the heat medium and the battery 173 can be suppressed. Battery temperature sensor 175 detects the temperature of battery 173.

The five-way valve 180 is provided with five ports P1 to P5. The five-way valve 190 is provided with five ports P11 to P15.

As shown in FIG. 2, the battery 173 is provided in the flow path 170b of the battery circuit 170. The battery 173 exchanges heat with the heat medium in the flow path 170b. Flow path 170b is in thermal contact with battery 173. The flow path 170b is a flow path that connects port P2 of the five-way valve 180 and port P12 of the five-way valve 190. Note that the flow path 170b is an example of the "first flow path" of the present disclosure.

The low temperature radiator 122 is provided in the flow path 130a of the low temperature circuit 130. The flow path 130a is a flow path that connects port P5 of the five-way valve 180 and port P15 of the five-way valve 190. Note that the flow path 130a is an example of the "third flow path" of the present disclosure.

The PCU 133, oil cooler 134, etc. are provided in the flow path 130b of the low temperature circuit 130. The PCU 133, oil cooler 134, etc. exchange heat with the heat medium in the flow path 130b. Flow path 130b is in thermal contact with SPU 132, PCU 133, oil cooler 134, and buck-boost converter 135. The flow path 130b is a flow path that connects the port P3 of the five-way valve 180 and the port P13 of the five-way valve 190. Note that the flow path 130b is an example of a "second flow path" in the present disclosure.

Chiller 160 is provided in channel 170a of battery circuit 170. The flow path 170a is a flow path that connects the port P1 of the five-way valve 180 and the port P11 of the five-way valve 190. Note that the flow path 170a is an example of the "fourth flow path" of the present disclosure.

FIGS. 2 and 3 are conceptual diagrams showing outlines of a first communication pattern and a second communication pattern of the thermal management circuit 100 formed by controlling the five-way valve 180 and the five-way valve 190, respectively. Note that the first communication pattern is an example of the "temperature increasing circuit" of the present disclosure.

In the first communication pattern, the five-way valve 180 forms a path that communicates between ports P1 and P2 and a path that communicates between ports P3 and P4. Furthermore, the five-way valve 190 forms a path that communicates between ports P11 and P12, and a path that communicates between ports P13 and P14.

As a result, a closed circuit 10 is formed in which the flow path 170b and the flow path 170a of the battery circuit 170 are connected. The closed circuit 10, the flow path 130b (PCU 133, etc.), and the flow path 130a (low temperature radiator 122) are separated from each other and become independent. As a result, the temperature of the heat medium in the flow path 130b is increased due to the heat generated by the PCU 133 and the like. Note that the closed circuit 10 is an example of the "first connection channel" of the present disclosure.

In the second communication pattern, the five-way valve 180 forms a path that communicates ports P1 and P2 and a path that communicates ports P3 and P5. Furthermore, the five-way valve 190 forms a path that communicates between ports P11 and P12, and a path that communicates between ports P13 and P15.

As a result, a closed circuit 10 is formed. Further, a closed circuit 20 is formed in which the flow path 130a and the flow path 130b are connected. Thereby, the heat of the heat medium in the flow path 130b is released to the outside (outside air) by the low temperature radiator 122. As a result, the heat medium in the flow path 130b is cooled. Note that the closed circuit 20 is an example of the "second connection channel" of the present disclosure.

Here, a thermal management system is desired that can easily adjust the temperature of the battery 173 while increasing the temperature of the heat medium flowing through the PCU 133 and the like.

Therefore, in the first embodiment, the ECU 500 controls the five-way valves (180, 190) so that the closed circuit 10 is formed during temperature increase control to increase the temperature of the heat medium in the flow path 130b.

Control Method of Thermal Management Circuit

Figure 4:
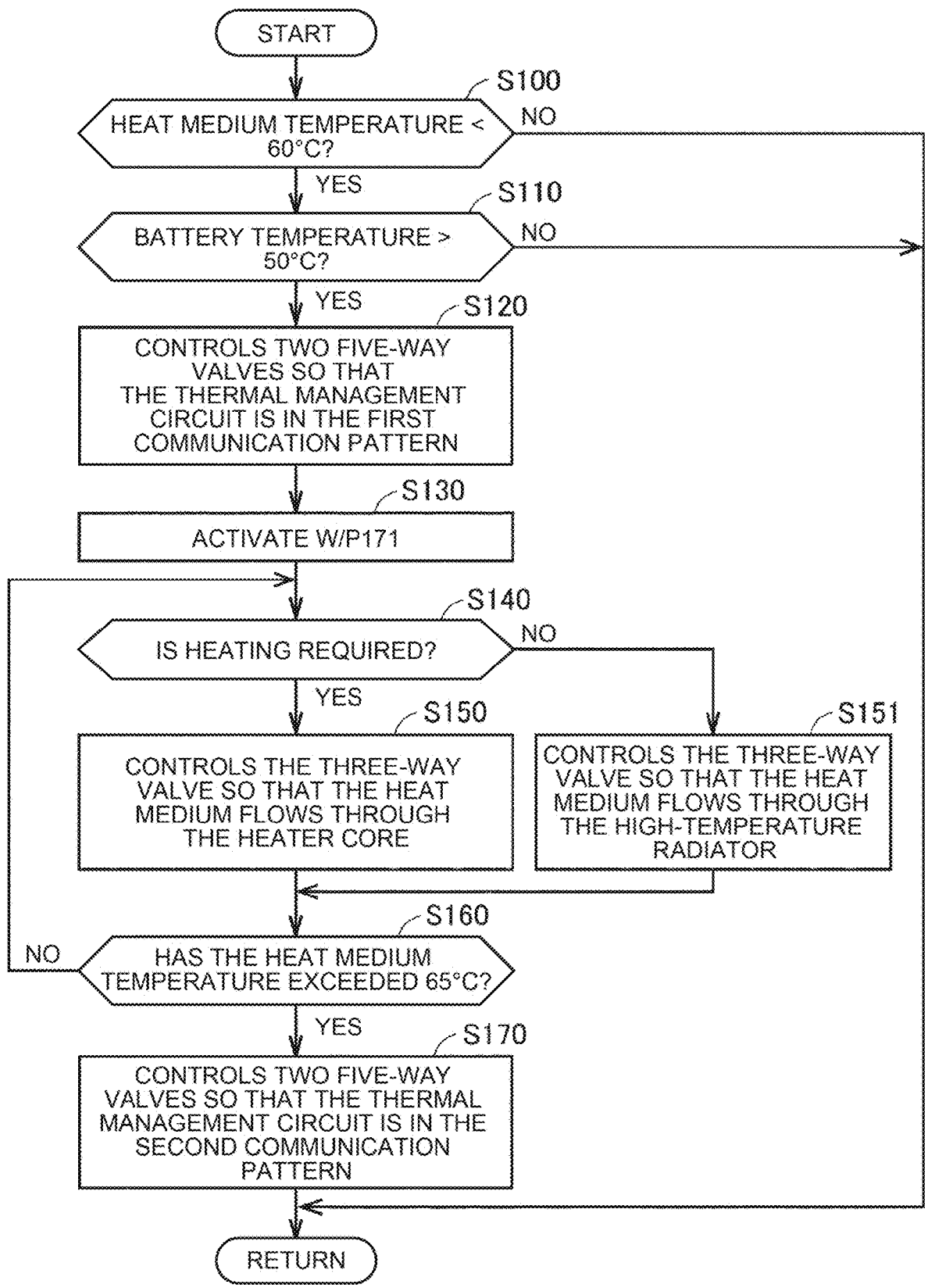
FIG. 4 is a flow diagram showing control of the thermal management system according to the first embodiment.

A method of controlling the thermal management system 1 will be explained with reference to the flow diagram of FIG. 4. Note that the flow shown in FIG. 4 is just an example, and the control in the present disclosure is not limited to the example shown in FIG. 4. Further, the control shown in FIG. 4 is executed at predetermined intervals.

In S100, ECU 500 determines whether the temperature of the heat medium in flow path 130b detected by heat medium temperature sensor 137 is less than 60° C. If the temperature of the heat medium is less than 60° C. (Yes in S100), the process proceeds to S110. If the temperature of the heat medium is 60° C. or higher (No in S100), the process ends. Note that 60° C. is an example of the "threshold" and "first threshold" of the present disclosure.

In S110, the ECU 500 determines whether the temperature of the battery 173 detected by the battery temperature sensor 175 is higher than 50° C. If the temperature of battery 173 is higher than 50° C. (Yes in S110), the process advances to S120. If the temperature of the battery 173 is 50° C. or lower (No in S110), the process ends. Note that 50° C. is an example of the "threshold value" and the "second threshold value" of the present disclosure.

In S120, ECU 500 controls each of five-way valve 180 and five-way valve 190 so that thermal management circuit 100 adopts the first communication pattern shown in FIG. 2. In S130, ECU 500 operates water pump 171.

In S140, ECU 500 determines whether there is a request from the user of the electrified vehicle to activate the heating. If there is the above request (Yes in S140), the process proceeds to S150. If there is no such request (No in S140), the process proceeds to S151.

In S150, the ECU 500 controls the three-way valve 113 so that the heat medium of the high temperature circuit 110 flows through the heater core 114. Thereby, the heat of the heat medium in the closed circuit 10 is used by the heater core 114 for heating. As a result, the temperature of battery 173 decreases. Next, the process advances to S160.

In S151, the ECU 500 controls the three-way valve 113 so that the heat medium of the high temperature circuit 110 flows through the high temperature radiator 121. As a result, the heat of the heat medium in the closed circuit 10 is released to the outside (for example, to the outside air) by the high temperature radiator 121. As a result, the temperature of battery 173 decreases. Next, the process advances to S160.

In S160, it is determined whether the temperature of the heat medium in the flow path 130b detected by the heat medium temperature sensor 137 exceeds 65° C. If the temperature of the heat medium exceeds 65° C. (Yes in S160), the process proceeds to S170. If the temperature of the heat medium does not exceed 65° C. (No in S160), the process returns to S140.

In S170, the thermal management circuit 100 controls each of the five-way valve 180 and the five-way valve 190 to adopt the second communication pattern shown in FIG. 3. The process then ends.

As described above, in the first embodiment, the ECU 500 controls the five-way valves (180, 190) such that the closed circuit 10, the PCU 133, etc., and the low temperature radiator 122 are separated from each other and become independent when controlling the temperature increase of the heat medium in the flow path 130b. Thereby, heat generated by the PCU 133 and the like can be stored in the flow path 130b. Further, the heat of the battery 173 can be used for heating through the chiller 160 or can be released to the outside (outside air). As a result, the temperature of the battery 173 can be easily adjusted while increasing the temperature of the heat medium flowing through the PCU 133.

Second Embodiment

Overall Structure

Figure 5:
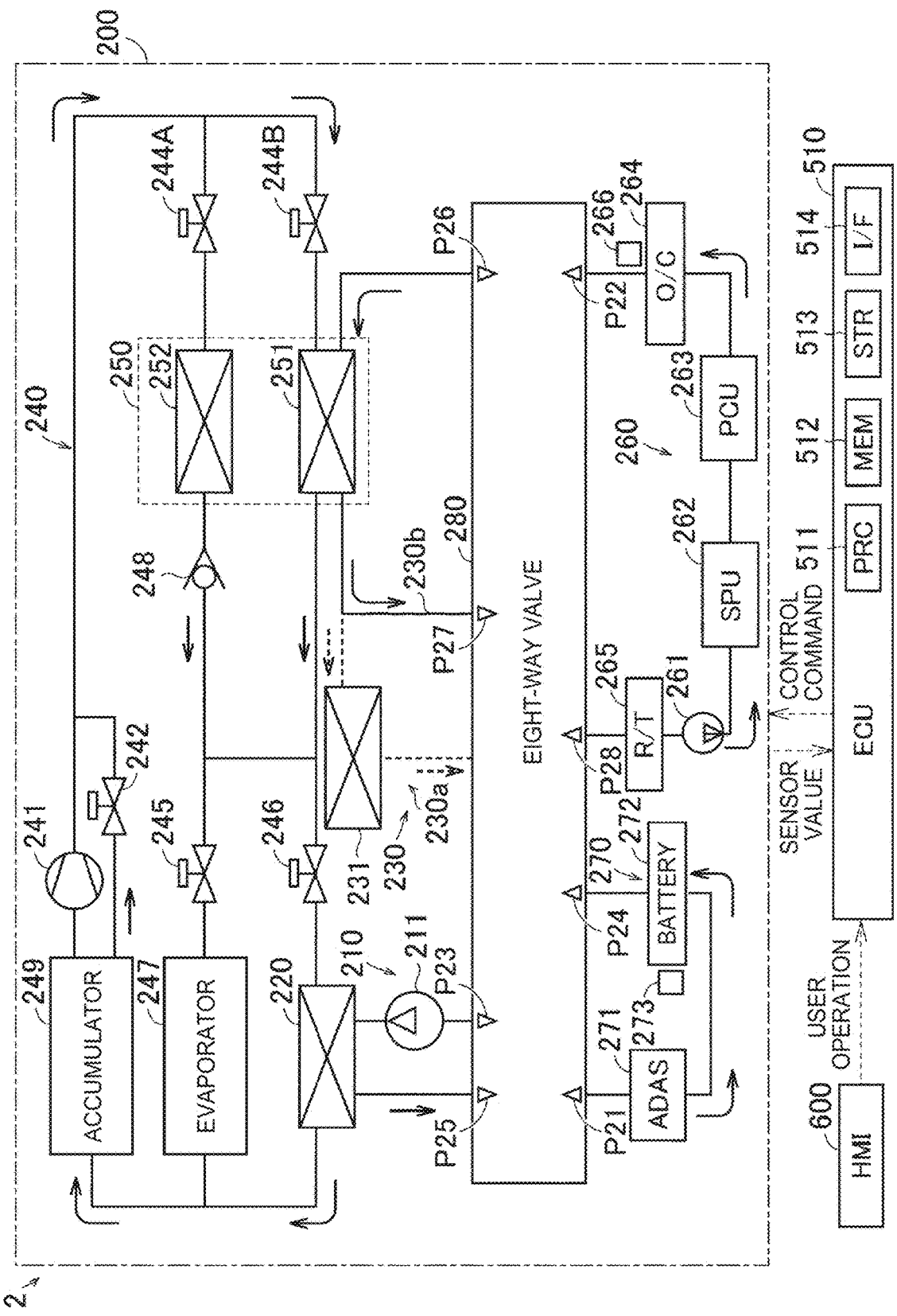
FIG. 5 is a diagram showing the configuration of a thermal management system according to the second embodiment.

As shown in FIG. 5, the thermal management system 2 includes a thermal management circuit 200 and an ECU 510.

Thermal management circuit 200 includes, for example, a chiller circuit 210, a chiller 220, a radiator circuit 230, a refrigeration cycle 240, a condenser 250, a drive unit circuit 260, a battery circuit 270, and an eight-way valve 280. Note that the eight-way valve 280 and the chiller 220 are examples of a "switching device" and a "chiller device" of the present disclosure, respectively.

Chiller circuit 210 includes a water pump (W/P) 211. Chiller 220 is connected (shared) with both chiller circuit 210 and refrigeration cycle 240.

Radiator circuit 230 includes a radiator 231. Refrigeration cycle 240 includes, for example, a compressor 241, a solenoid valve 242, solenoid valves 244A, 244B, 245, 246, an evaporator 247, a check valve 248, and an accumulator 249. Condenser 250 includes a water-cooled condenser 251 and an air-cooled condenser 252. Water-cooled condenser 251 is connected to both refrigeration cycle 240 and radiator circuit 230.

Drive unit circuit 260 includes, for example, water pump 261, SPU 262, PCU 263, oil cooler 264, reservoir tank 265, and heat medium temperature sensor 266. Note that the PCU 263 and the oil cooler 264 are examples of the "drive device" of the present disclosure. Further, the heat medium temperature sensor 266 is an example of a "medium temperature sensor" of the present disclosure.

Battery circuit 270 includes, for example, Advanced Driver-Assistance Systems (ADAS) 271, a battery 272, and a battery temperature sensor 273. Note that the battery 272 and the battery temperature sensor 273 are examples of a "power storage device" and a "device temperature sensor" of the present disclosure, respectively.

ECU 510 controls thermal management circuit 200. ECU 510 includes a processor 511, memory 512, storage 513, and interface 514.

Eight-way valve 280 includes eight ports P21 to P28. The eight-way valve 280 is connected to the chiller circuit 210, the radiator circuit 230, the drive unit circuit 260, and the battery circuit 270.

The heat medium circulating in the chiller circuit 210 flows through a path of eight-way valve 280 (port P23), water pump 211, chiller 220, and eight-way valve 280 (port P25).

The heat medium circulating in the radiator circuit 230 is distributed between the eight-way valve 280 (port P26), the water-cooled condenser 251, the bypass plow path 230b, the first flow path of the eight-way valve 280 (port P27), and the eight-way valve 280 (port P26)—water-cooled It flows through either one of the water-cooled condenser 251, the radiator 231, and the second flow path of the eight-way valve 280 (port P27). That is, the eight-way valve 280 is configured such that the port P27 can be connected to either the radiator 231 or the bypass flow path 230b.

The heat medium (gas-phase refrigerant or liquid-phase refrigerant) circulating in the refrigeration cycle 240 is compressor 241—solenoid valve 244A—air-cooled condenser 252—check valve 248—solenoid valve (expansion valve) 245—evaporator 247—accumulator 249—compressor 241 first route, compressor 241—solenoid valve 244A—air-cooled condenser 252—check valve 248—solenoid valve (expansion valve) 246—chiller 220—accumulator 249—compressor 241 second route, compressor 241—solenoid valve 244B—water cooled condenser 251—solenoid valve (expansion valve) 245—evaporator 247—accumulator 249—third path of compressor 241, compressor 241—solenoid valve 244B—water cooled condenser 251—solenoid valve 246—chiller 220—accumulator 249—compressor It is distributed through one of the 241 fourth routes.

Compressor 241 compresses the gas phase refrigerant circulating through refrigeration cycle 240 according to control commands from ECU 510. The solenoid valve 242 is connected in parallel to the compressor 241 and adjusts the amount of gas phase refrigerant flowing into the compressor 241 according to a control command from the ECU 510. The solenoid valves 244 (244A, 244B) switch whether the gas phase refrigerant discharged from the compressor 241 flows into the water-cooled condenser 251 or the air-cooled condenser 252 according to a control command from the ECU 510. The water-cooled condenser 251 exchanges heat between the gaseous refrigerant discharged from the compressor 241 and the heat medium flowing through the radiator circuit 230. The air-cooled condenser 252 exchanges heat with the air introduced into the vehicle cabin and produces warm air. The solenoid valve 245 restricts the flow of liquid phase refrigerant into the evaporator 247 according to a control command from the ECU 510. The solenoid valve 246 restricts the flow of liquid phase refrigerant into the chiller 220 according to a control command from the ECU 510. The solenoid valves 245 and 246 also have the function of expanding the liquid phase refrigerant. The accumulator 249 removes liquid phase refrigerant from the refrigerant in a gas-liquid mixed state, and suppresses the liquid phase refrigerant from being sucked into the compressor 241 when the refrigerant is not completely vaporized by the evaporator 247.

The heat medium (cooling fluid) circulating through the drive unit circuit 260 is routed through the eight-way valve 280 (port P28), the reservoir tank 265, the water pump 261, the SPU 262, the PCU 263, the oil cooler 264, and the eight-way valve 280 (port P22).

The heat medium temperature sensor 266 detects the temperature of the heat medium in a flow path (flow path 260a to be described later) in which the PCU 263 and the like are provided.

The heat medium (coolant) circulating in the battery circuit 270 flows through a path of eight-way valve 280 (port P21), ADAS 271, battery 272, and eight-way valve 280 (port P24).

Figure 6:
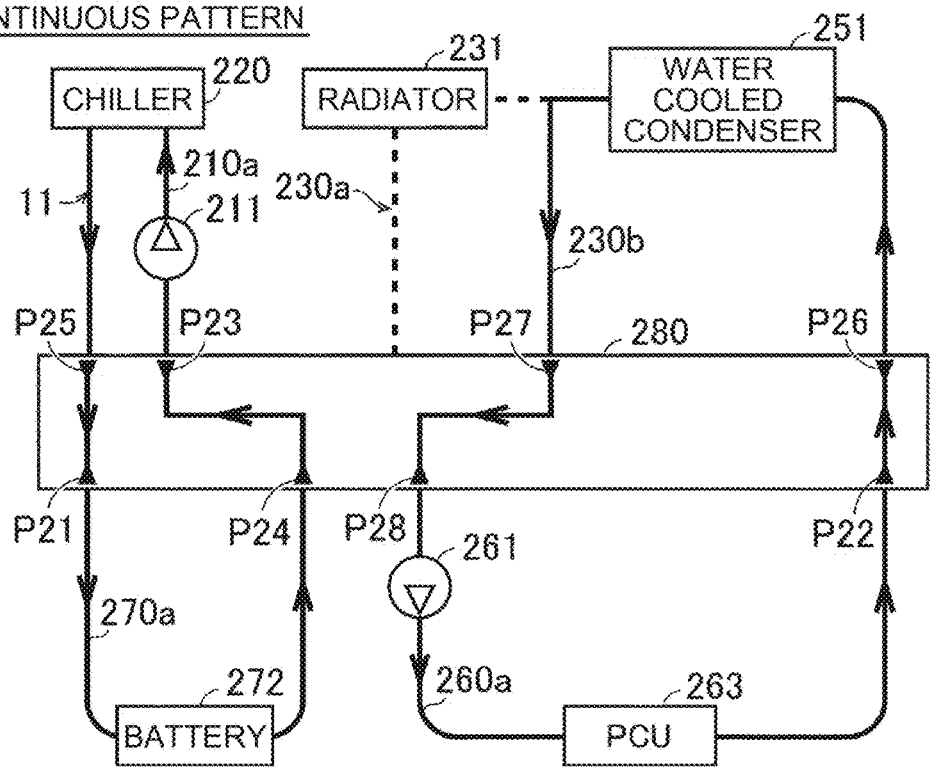
FIG. 6 is a diagram showing a first communication pattern of the thermal management circuit according to the second embodiment.

As shown in FIG. 6, the chiller 220 is provided in the flow path 210a of the chiller circuit 210. Flow path 210a is a flow path that connects port P23 and port P25 of eight-way valve 280. Note that the flow path 210a is an example of the "fourth flow path" of the present disclosure.

Radiator 231 is provided in flow path 230a of radiator circuit 230. Further, the flow path 230a includes a bypass flow path 230b. Bypass flow path 230b is provided to connect a portion between water-cooled condenser 251 and radiator 231 and eight-way valve 280. Note that the flow path 230a is an example of the "third flow path" of the present disclosure.

The PCU 263, oil cooler 264, etc. are provided in the flow path 260a of the drive unit circuit 260. Flow path 260a is a flow path that connects port P28 and port P22 of eight-way valve 280. Note that the flow path 260a is an example of a "second flow path" in the present disclosure.

The battery 272 is provided in the flow path 270a of the battery circuit 270. Flow path 270a is a flow path that connects port P21 and port P24 of eight-way valve 280. Note that the flow path 270a is an example of the "first flow path" of the present disclosure.

Figure 7:
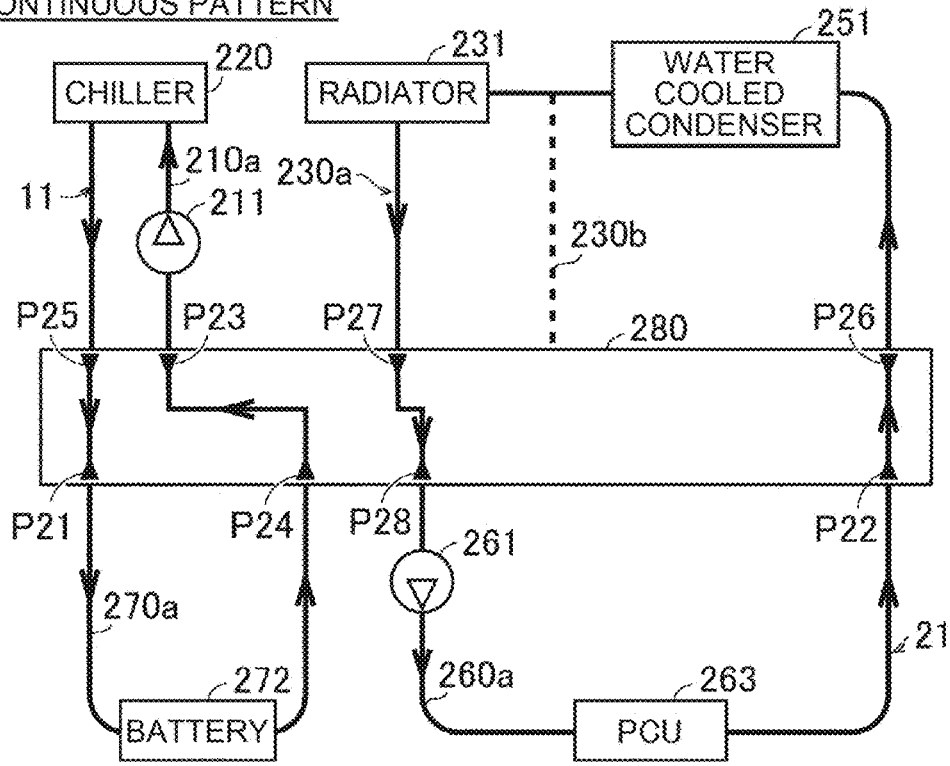
FIG. 7 is a diagram showing a second communication pattern of the thermal management circuit according to the second embodiment.

FIGS. 6 and 7 are conceptual diagrams showing the outline of the first communication pattern and the second communication pattern by the eight-way valve 280, respectively. Note that the first communication pattern is an example of the "temperature increasing circuit" of the present disclosure.

In the first communication pattern (see FIG. 6), a path that communicates between port P25 and port P21 and a path that communicates between port P23 and port P24 are formed. As a result, the heat medium flows through the closed circuit 11 of water pump 211—chiller 220—eight-way valve 280—battery 272—eight-way valve 280—water pump 211. Note that the closed circuit 11 is an example of the "first connection channel" of the present disclosure.

Furthermore, in the first communication pattern, a path that communicates between port P22 and port P26 and a path that communicates between port P27 and port P28 are formed. Furthermore, in the first communication pattern, the bypass flow path 230b is connected to the port P27. As a result, the heat medium flows through the water pump 261—PCU 263—eight-way valve 280—water-cooled condenser 251—bypass flow path 230b—eight-way valve 280—water pump 261.

The second communication pattern (see FIG. 7) differs from the first communication pattern in that the port P27 is connected to the radiator 231 instead of the bypass flow path 230b. In this case, the heat medium flows through the closed circuit 21 of water pump 261—PCU 263—eight-way valve 280—water-cooled condenser 251—radiator 231—eight-way valve 280—water pump 261. Further, the closed circuit 11 is also formed in the second communication pattern. Note that the closed circuit 21 is an example of the "second connection channel" of the present disclosure.

Control Method of Thermal Management Circuit

Figure 8:
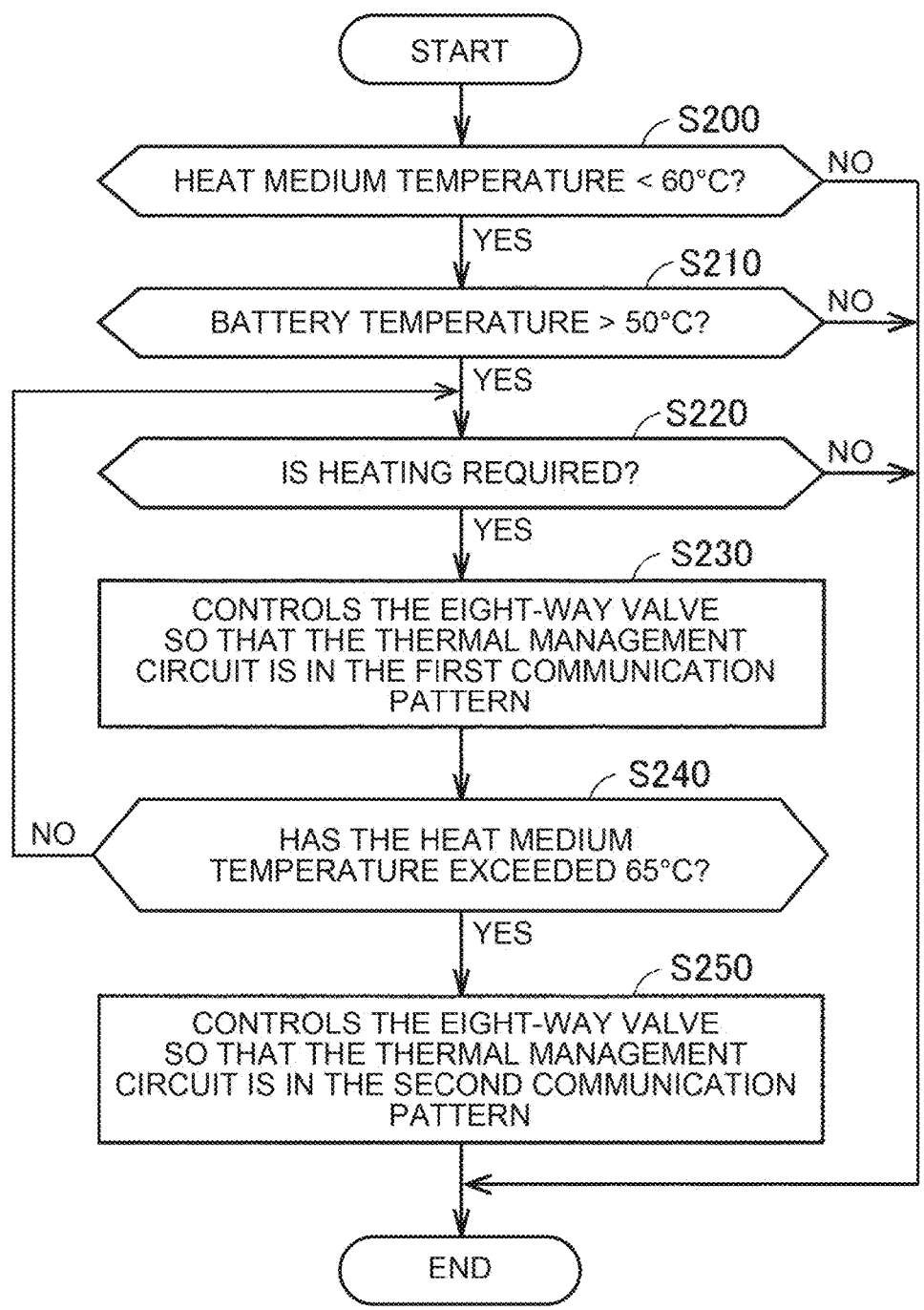
FIG. 8 is a flow diagram showing control of the thermal management system according to the second embodiment.

A method of controlling the thermal management system 2 will be explained with reference to the flow diagram of FIG. 8. Note that the description of steps similar to the control flow in the first embodiment will be simplified or omitted.

The processes of S200 and S210 are the same as S100 and S110 of the first embodiment, respectively.

In S220, the ECU 510 determines whether there is a request from the user of the electrified vehicle to activate the heating. If there is the above request (Yes in S220), the process proceeds to S230. If there is no such request (No in S220), the process ends.

In S230, the ECU 510 controls the eight-way valve 280 so that the thermal management circuit 200 adopts the first communication pattern shown in FIG. 6.

In S240, it is determined whether the temperature of the heat medium in the flow path 260a detected by the heat medium temperature sensor 266 exceeds 65° C. If the temperature of the heat medium exceeds 65° C. (Yes in S240), the process proceeds to S250. If the temperature of the heat medium does not exceed 65° C. (No in S240), the process returns to S220.

In S250, the thermal management circuit 200 controls the eight-way valve 280 to adopt the second communication pattern shown in FIG. 7. The process then ends.

Figure 9:
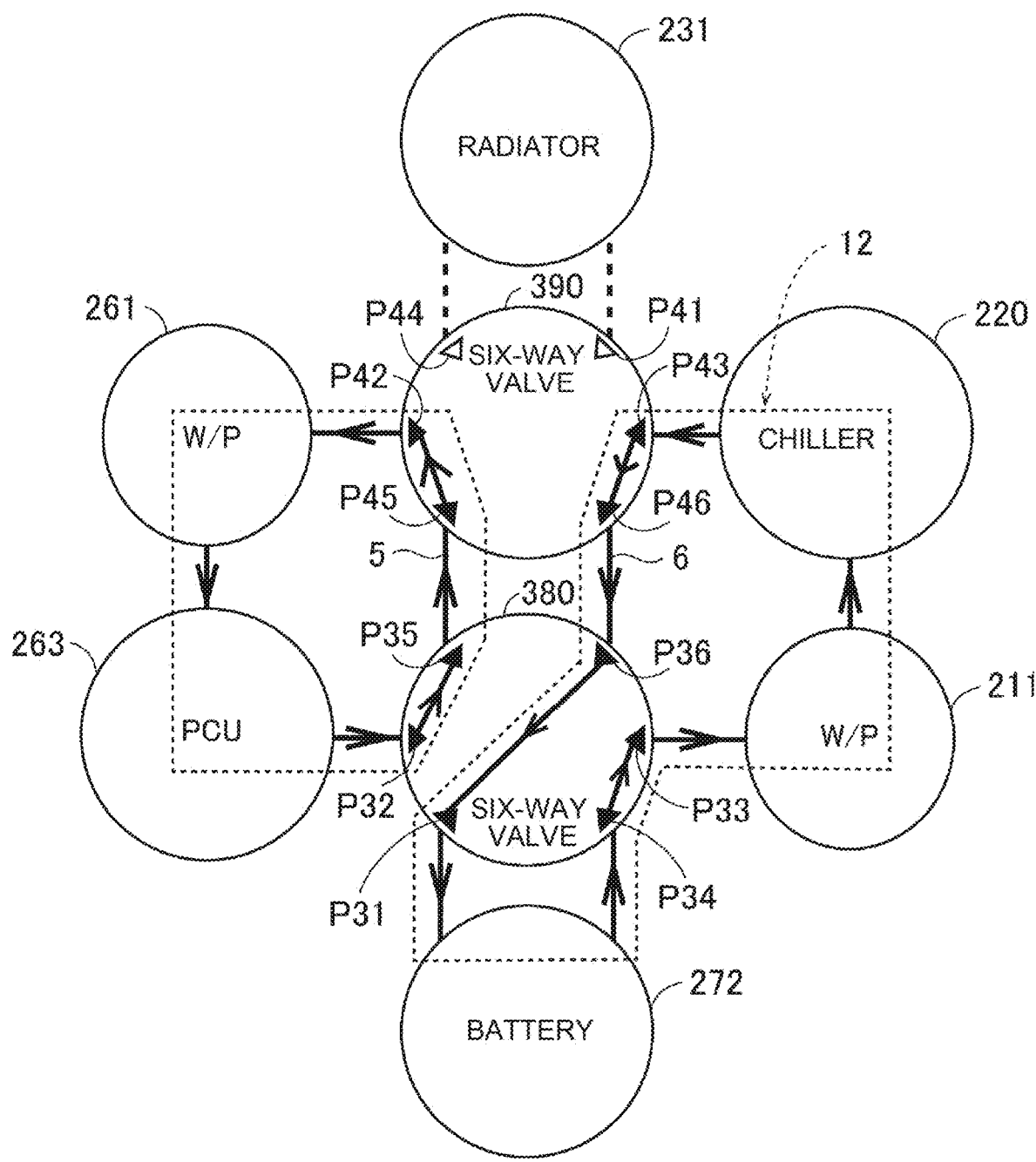
FIG. 9 is a schematic diagram showing the configuration of a thermal management system according to a modification of the first and second embodiments.

FIG. 9 shows an example in which a six-way valve 380 and a six-way valve 390 are used as the switching devices. The six-way valve 380 includes six ports P31 to P36. Moreover, the six-way valve 390 includes six ports P41 to P46. Port P35 of the six-way valve 380 and port P45 of the six-way valve 390 are connected through the flow path 5. Further, port P36 of the six-way valve 380 and port P46 of the six-way valve 390 are connected by the flow path 6.

In the example shown in FIG. 9, the heat medium is water pump 211—chiller 220—port P43—port P46—flow path 6—port P36—port P31—battery 272—port P34—port P33—closed circuit of water pump 211. 12 will be distributed. Note that the closed circuit 12 is the "first connection channel" of the present disclosure.

Further, the heat medium flows through the closed circuit 22 of water pump 261—PCU 263—port P32—port P35—channel 5—port P45—port P42—water pump 261. Note that although FIG. 9 shows an example in which the eight-way valve 280 in the configuration of the second embodiment is replaced with a six-way valve (380, 390), the five-way valve (180, 190) of the first embodiment may be replaced with a six-way valve (380, 390).

In the first and second embodiments described above, an example is shown in which the first communication pattern is formed when the temperature of the heat medium is less than 60° C. and the temperature of the battery is higher than 50° C. Not limited. For example, the first communication pattern may be formed based only on either the temperature of the heat medium or the temperature of the battery.

In the first and second embodiments described above, an example is shown in which the second communication pattern is formed when the temperature of the heat medium exceeds 65° C., but the present disclosure is not limited to this. For example, the second communication pattern may be formed when the temperature of the heat medium reaches 60° C. or higher.

Note that the configurations (processing) of the above-described embodiment and each of the above-described modifications may be combined with each other.

The embodiment disclosed herein should be considered as illustrative and not restrictive in all respects. The scope of the present disclosure is shown by the claims, rather than the above embodiments, and is intended to include all modifications within the meaning and the scope equivalent to those of the claims.

What is claimed is:

1. A thermal management system comprising:
   a first flow path, a second flow path, a third flow path, and a fourth flow path through which a heat exchange medium flows;
   a power storage device that exchanges heat with the heat exchange medium in the first flow path;
   a drive device that exchanges heat with the heat exchange medium in the second flow path and that is configured to generate driving force;
   a radiator provided in the third flow path;
   a chiller device provided in the fourth flow path; and
   a switching device configured to switch a connection state between the first flow path, the second flow path, the third flow path, and the fourth flow path, each of the first flow path, the second flow path, the third flow path, and the fourth flow path being connected to the switching device, wherein
      the switching device switches to a first connection state, in which the first flow path is connected to the fourth flow path, and the second flow path and the third flow path are not connected to each other when the heat exchange medium in the second flow path is heated.

2. The thermal management system according to claim 1, further comprising:
   a second flow path temperature sensor that detects a second flow path temperature of the heat exchange medium in the second flow path, wherein
      the switching device switches to the first connection state in response to the detected second flow path temperature falling below a second flow path threshold temperature.

3. The thermal management system according to claim 2, wherein
   the switching device switches to a second connection state, in which the second flow path is connected to the third flow path, and the first flow path is connected to the fourth flow path, in response to the detected second flow path temperature becoming equal to or greater than the second flow path threshold temperature as the heat exchange medium in the second flow path is heated.

4. The thermal management system according to claim 1, further comprising:
   a power storage device temperature sensor that detects a power storage device temperature of the power storage device, wherein
      the switching device switches to the first connection state in response to the detected power storage device temperature exceeding a power storage device threshold temperature.

5. The thermal management system according to claim 1, further comprising:
   a heat exchange medium temperature sensor that detects a second flow path temperature of the heat exchange medium in the second flow path; and
   a power storage device temperature sensor that detects a power storage device temperature of the power storage device, wherein
      the switching device switches to the first connection state in response to
         the detected second flow path temperature falling below a second flow path threshold temperature, and
         the detected power storage device temperature exceeding a power storage device threshold temperature,
      the power storage device threshold temperature being lower than the second flow path threshold temperature.

6. The thermal management system according to claim 1, further comprising:
   a second switching device configured to switch a connection state between the first flow path, the second flow path, the third flow path, and the fourth flow path, each of the first flow path, the second flow path, the third flow path, and the fourth flow path being connected to the second switching device, wherein
      the switching device is provided upstream of the power storage device in the flow direction of the heat exchange medium in the first flow path,
      the second switching device is provided downstream of the power storage device in the flow direction of the heat exchange medium in the first flow path, and
      the second switching device switches to the first connection state when-the heat exchange medium in the second flow path is heated.

7. The thermal management system according to claim 2, wherein the second flow path threshold temperature is in a range of from 60° C. to 65° C.

8. The thermal management system according to claim 4, wherein the power storage device threshold temperature is 50° C.

* * * * *